United States Patent
Crawford et al.

[19]

[11] Patent Number: 5,994,844
[45] Date of Patent: Nov. 30, 1999

[54] VIDEO LIGHTHEAD WITH DIMMER CONTROL AND STABILIZED INTENSITY

[75] Inventors: James J. Crawford; Kevin J. Crawford, both of Ringwood, N.J.

[73] Assignee: Frezzolini ELectronics, Inc., Hawthorne, N.J.

[21] Appl. No.: 08/989,923

[22] Filed: Dec. 12, 1997

[51] Int. Cl.⁶ .............................. G03B 15/02; G01J 1/32
[52] U.S. Cl. ...................... 315/151; 315/158; 315/224; 362/4
[58] Field of Search ................... 315/149, 151, 315/150, 152, 155, 158, 297, 153, 307, 362, DIG. 4, 208, 224; 362/4, 5, 18, 276

[56] References Cited

U.S. PATENT DOCUMENTS

| | | | |
|---|---|---|---|
| 3,967,106 | 6/1976 | Chen | 362/4 |
| 4,192,584 | 3/1980 | Dougherty | 353/30 |
| 4,300,075 | 11/1981 | Foose et al. | 315/307 |
| 4,368,406 | 1/1983 | Kruzich et al. | 315/158 |
| 4,749,913 | 6/1988 | Stuermer et al. | 315/175 |
| 4,959,755 | 9/1990 | Hochstein | 315/151 |
| 5,146,153 | 9/1992 | Luchaco et al. | 323/324 |
| 5,467,152 | 11/1995 | Wilson et al. | 353/99 |
| 5,747,938 | 5/1998 | Beard | 315/155 |

Primary Examiner—Don Wong
Assistant Examiner—Wilson Lee
Attorney, Agent, or Firm—Darby & Darby

[57] ABSTRACT

A video lighthead mountable to a video camera and having a dimmer control that varies the intensity of the light output from the lighthead using pulse width modulation techniques. A photo sensor measures the intensity of light reflected from a subject in front of the lighthead. The intensity of light output from the lighthead is adjusted by control circuitry in response to changes in measured reflected light intensity to maintain a constant level of illumination. The adjustment is carried out by modifying the duty cycle of a pulse width modulation circuit. The duty cycle adjustment of the pulse width modulation is also used to compensate for supply voltage variations in order to maintain constant light output.

7 Claims, 8 Drawing Sheets

VIDEO LIGHTHEAD WITH DIMMER CONTROL AND STABILIZED INTENSITY

BACKGROUND OF THE INVENTION

The present invention relates to a portable video lighthead typically used on video cameras. These lightheads may be used, for example, to provide illumination for video cameras used under low light level conditions and light fill situations when overhead lighting or strong sunlight creates dark shadows on the subject.

Portable video lightheads are exemplified by the Mini-Fill lighthead line of Frezzolini Electronics, Inc. of Hawthorne, N.J. They are extremely lightweight at about 12 ounces and have a compact size of 2 by 4.5 inches. They typically operate from any 12 to 14 or 30 volt battery, utilize high efficiency mirror lamps and operate in the range of 20–100 watts. They mount on any video camera, such as those used by the broadcasting industry for televising events.

When used indoors, the Mini-Fill lightheads may be too bright for some purposes. It is therefore desirable to modify the brightness of the Mini-Fill lightheads so that they may be used indoors and yet satisfy the requirements for less obtrusive lightheads.

Further, it is also desirable to maintain the overall brightness selected by the user at a constant level, even as ambient lighting conditions change, as the lighthead battery voltage drops, and as the subject moves closer to or further from the light source.

SUMMARY OF THE INVENTION

These and other problems are solved by the present invention, which, in one embodiment, provides a lighthead mountable on a video camera. The intensity of the emitted light is varied using pulse width modulation techniques. A light sensor coupled to the lighthead detects the intensity of reflected light and stores this value in an electronic storage area. The detected light intensity of the reflected light is compared with a presently measured light intensity and the intensity of the light emitted by the lighthead is adjusted to maintain a constant illumination of a subject even as ambient lighting conditions change. The intensity of the emitted light is also maintained as constant in response to dropping battery voltage over time. The detected light levels may also used to provide preset lighting levels which can be recalled at the push of a button.

BRIEF DESCRIPTION OF THE DRAWINGS

For a better understanding of the present invention, reference is made to the following description and accompanying drawings, in which.

DESCRIPTION OF THE PREFERRED EMBODIMENT

Figure 1:
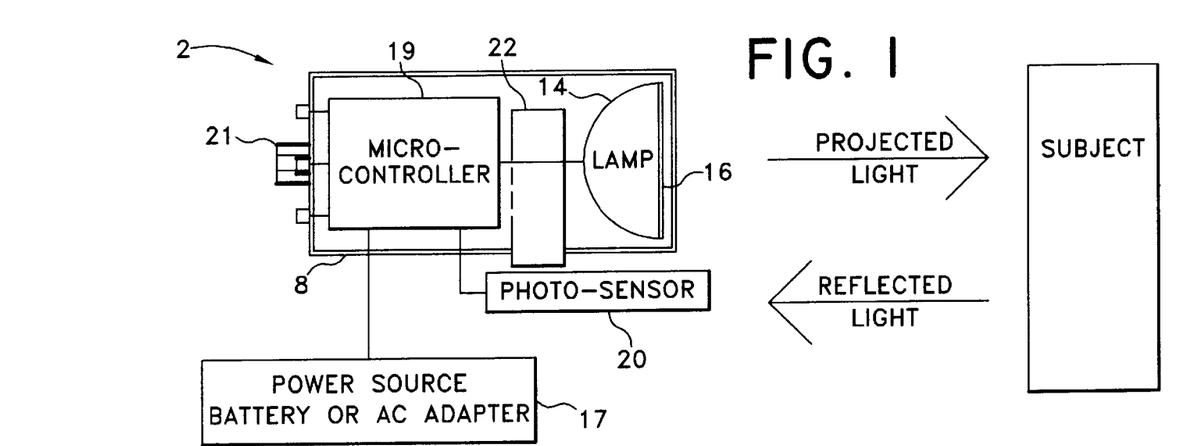
FIG. 1 is a block diagram of a lighthead in accordance with the present invention.
Figure 2:
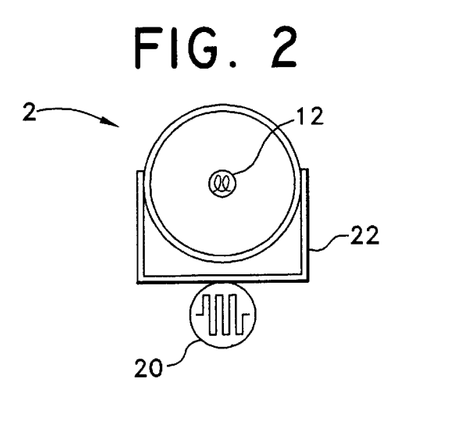
FIG. 2 is a front view of the lighthead of FIG. 1.
Figure 3:
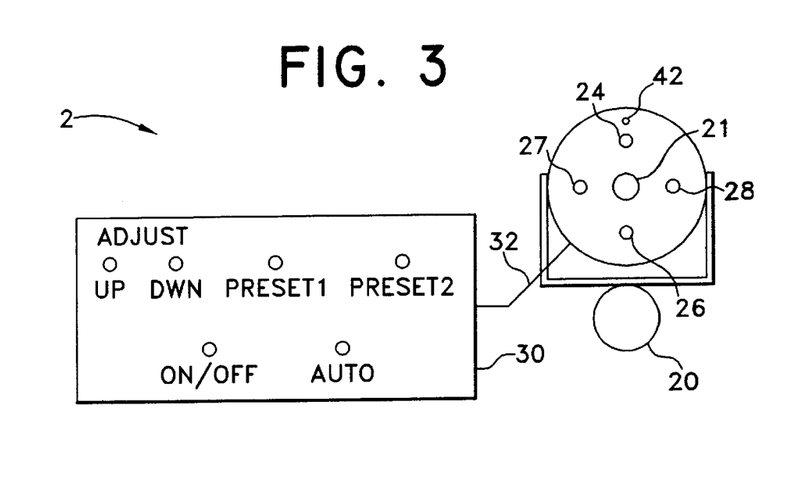
FIG. 3 is a back view of the lighthead of FIG. 1.

FIGS. 1–3 show a lighthead 2 of the present invention which may be mounted on a video camera (not shown). The lighthead 2 includes a housing 8, a light source or bulb 12, a concave reflector 14 for reflecting light shining from the bulb to the front of the lighthead, and a transparent or translucent lens 16 in front of the reflector and bulb.

The lighthead 2 is powered from a power source 17 which may be a battery or an AC adapter. In the preferred embodiment, the voltage is continuously monitored and the lamp is disabled when the measured voltage falls below a preset level. This is discussed in more detail below.

In accordance with the invention, the intensity of the light emitted by the lighthead 2 is controlled using pulse width modulation techniques. The modulation frequency should be higher than the audio frequency band, otherwise the pulse modulation of the components may create a perceivable hum or whistle. The maximum modulation frequency is limited by the response time of the lamp filament and the switching circuit connected to the lamp. The intensity of the light is varied by adjusting the duty cycle of the pulse width modulated power signal applied to the bulb 12. This can be accomplished using input from a dimmer control such as rotary encoder 21. However, other methods, such as a slidable switch or a pair of "up" and "down" switches may also be used.

In the preferred embodiment, the lighthead functions, including sensing user inputs and modulating the duty cycle, are controlled by a microcontroller 19. However, analog and/or discrete circuit elements may also be used as will be apparent to those skilled in the art.

The modulated duty cycle (and thus the lamp brightness) is represented as a numerical value stored in memory, such as RAM, which may be provided as part of the microcontroller or as a separate RAM unit. Preferably, several RAM locations are provided in which duty cycle values are stored to allow for the selection of a number of preset light intensities. Alternatively, measured reflected light intensities may be stored to provide for selection of a number of preset lighting intensity levels based on the particular reflected light intensity. In the preferred embodiment, two such presets are provided which can be set by user input and retrieved to set the duty cycle of the light as needed.

The lighthead 2 includes a photo-sensor 20 which may be attached to housing 8 by a bracket 22. The photo-sensor 20 measures the intensity of light reflected from a subject in front of the lighthead 2. When the lighthead 2 is properly mounted on a camera, the measured intensity indicates the intensity of light entering the camera lens. The measured light intensity can be stored in memory in response to user input.

According to a preferred embodiment of the invention, the lighthead 2 operates in two primary modes —STANDARD and AUTO. In STANDARD mode, the lamp 12 is turned on by a power push button 24. The on condition is indicated by the activation of LED 42. The modulated duty cycle and therefore the light output intensity is controlled via the rotary encoder 21 connected to the micro-controller 19. To turn the lamp off, the power button 24 is pressed a second time.

When operated in AUTO mode, the lamp intensity is adjusted via the rotary encoder 21 to a desired level. When the desired level is obtained, the AUTO button 26 is pushed. In response, the micro-controller 19 samples the value of the reflected light as measured by photo-sensor 20 and stores the value in memory. From that point on, the micro-controller 19 uses updated reflected light intensity data from the photo-sensor 20 to automatically maintain the reflected light intensity at the previously stored intensity level by either increasing or decreasing the duty cycle of the operation of lamp 12, thus increasing or decreasing the lamp output intensity. As the battery voltage drops over time, the microprocessor will also adjust the intensity of lamp 12 to maintain a constant light output level. The AUTO mode is disabled by pressing the AUTO button 26 a second time.

The micro-controller 19 can also store and retrieve additional preset light intensity levels. To define a preset level, the lamp intensity is adjusted to a desired level by the operator using the rotary encoder 21. When the desired level is obtained, the user indicates that the level should be stored in the micro-controller 19. In the preferred embodiment, this is accomplished by continuously pressing the desired PRESET button 27, 28, for more than 3 seconds. In response, the duty cycle control value will be stored in a memory location in the micro-controller 19. This value represents the portion or percentage of the currently modulated pulse which is active. Preferably, the stored duty cycle level is recalled by pressing the appropriate PRESET button 27, 28, thus adjusting the lamp to the preset intensity level.

A remote input device 30 can also be provided to allow a user to control some or all of the lighthead 2 functions from a distance. The remote input device 30 is preferably connected to the microcontroller by a cable 32. However, the connection may also be by any of a number of other types of communication links, such as a conventional radio-frequency, infrared or optical link. Preferably, the remote input device 30 supports all functions of the lamphead 2.

Figure 4:
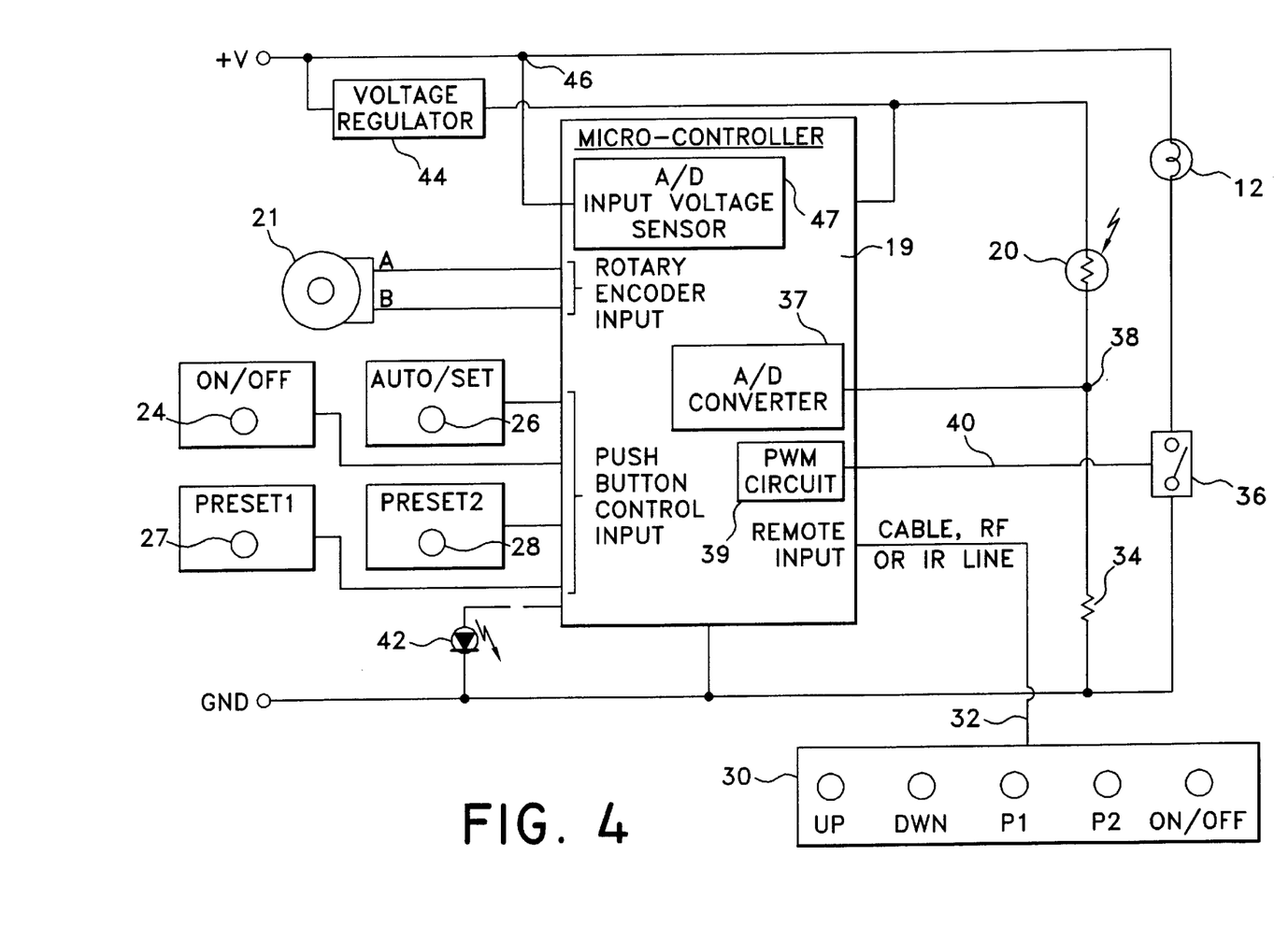
FIG. 4 is a schematic diagram of a lamp illumination circuit in accordance with the present invention.

FIG. 4 is a schematic diagram of a lamp illumination circuit in accordance with the invention. In the preferred embodiment, the micro-controller 19 is a RISC processor such as a PIC16C72 chip manufactured by Microchip Technology, Inc. This processor advantageously includes its own internal RAM, an analog-to-digital converter 37, as well as a free-running 25 kHz pulse width modulation circuit 39. Preferably, the microprocessor is operated at an external clock speed of approximately 4 MHz with an internal clock speed of approximately 1 MHz. In alternate embodiments, any or all of these circuit elements may be separate from the micro-controller 19.

The power for the micro-controller 19 is provided by a conventional 5-volt voltage regulator 44. The micro-controller 19 continuously monitors the supply voltage to the system from node 46 using analog to digital converter 47, here located within microcontroller 19, and will automatically turn off all lamp functions when the supply voltage falls below a preset level to insure that a full lighting range is always available. Other voltage sensing techniques may also be used, as will be apparent to those skilled in the art, and the result input to microcontroller 19. For example, a comparator may be used to determine whether the supply voltage (or a fraction thereof as determined by a voltage divider) is less than a preset reference voltage, such as the regulated voltage from voltage regulator 44. Alternatively, the supply voltage may be measured using a Zener diode with a breakdown voltage equal to the preset level.

The Power, Preset, and Auto switches, 24, 26, 27, and 28 are connected to inputs of the micro-controller 19. The rotary encoder 21 is connected to a rotary encoder input of the micro-controller 19. The microcontroller is preferably configured to indicate when the rotary encoder 21 is turned and in what direction. This may be done, e.g., by using a rotary encoder 21 that generates an asymmetric sequence of signals as it is rotated, and monitoring the input sequence pattern with the micro-controller. Other techniques known to those skilled in the art may also be used. The microcontroller 19 receives similar inputs from the remote input device 30 via link 32.

The photo-sensor 20 is preferably a photo-resistor and is connected in series between the power supply and a pull-down resistor 34. In this configuration, the voltage at node 38 of the photo-sensor 20 is proportional to the intensity of light striking the photo-sensor 20. Node 38 is connected to an analog-to-digital converter 37, here shown within micro-controller 19. The voltage at node 38 is converted into a digital value which indicates the intensity of light striking the photo-sensor 20.

The duty cycle of the pulse width modulated power signal applied to lamp 12 is controlled by micro-controller 19. Lamp 12 is connected in series with power transistor 36 which is switched on and off under the control of output signal 40 from the pulse width modulation circuit 39 (here shown within micro-controller 19) which drives the power transistor 36 in a conducting or a non-conducting state. Preferably, power transistor 36 is a power MOSFET with a low activation voltage.

The lighthead 2 functionality is controlled by a program executed by micro-controller 19. In the preferred embodiment, the program is stored in a memory physically located within micro-controller 19, however external storage can also be provided. The operating program will be discussed in detail below with reference to FIGS. 5–10.

Figure 5:
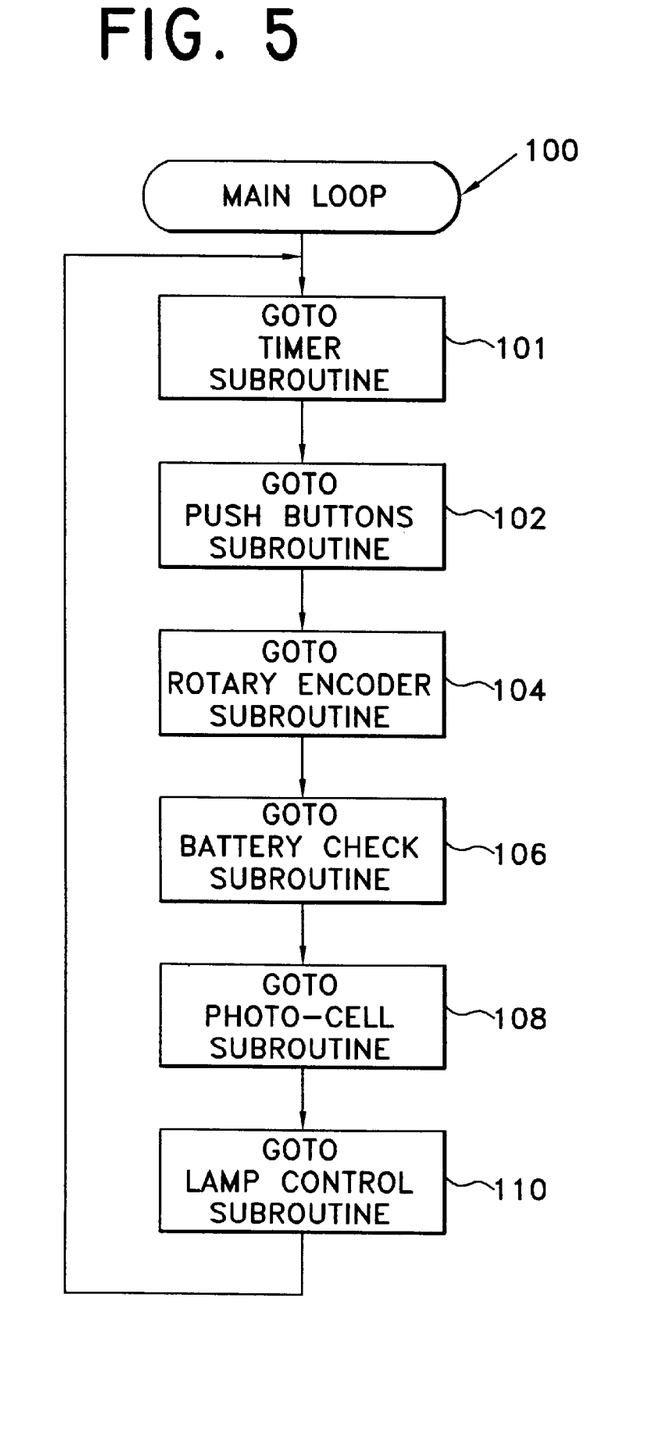
FIG. 5 is a flowchart of the main loop of a microcontroller program for a lighthead according to the present invention.

FIG. 5 is a flowchart of the Main Loop 100 of a micro-controller program for a lighthead according to the present invention. The Main Loop (step 100) controls the overall program flow between the various subroutines. The main loop consists of a series of GOTO commands (steps 101–110) which initiate the Timer, Push Button, Rotary encoder, Battery Check, Photo-Cell, and Lamp Control subroutines respectively. After each subroutine has been processed, the program loops and repeats steps 101–110. Using the preferred microcontroller 19 operating at an internal clock speed of approximately 1 MHz, the Main Loop is executed approximately once every millisecond. This timing is maintained by using a software delay routine, discussed below. Each subroutine in the Main Loop will now be discussed in turn.

Figures 10, 11:
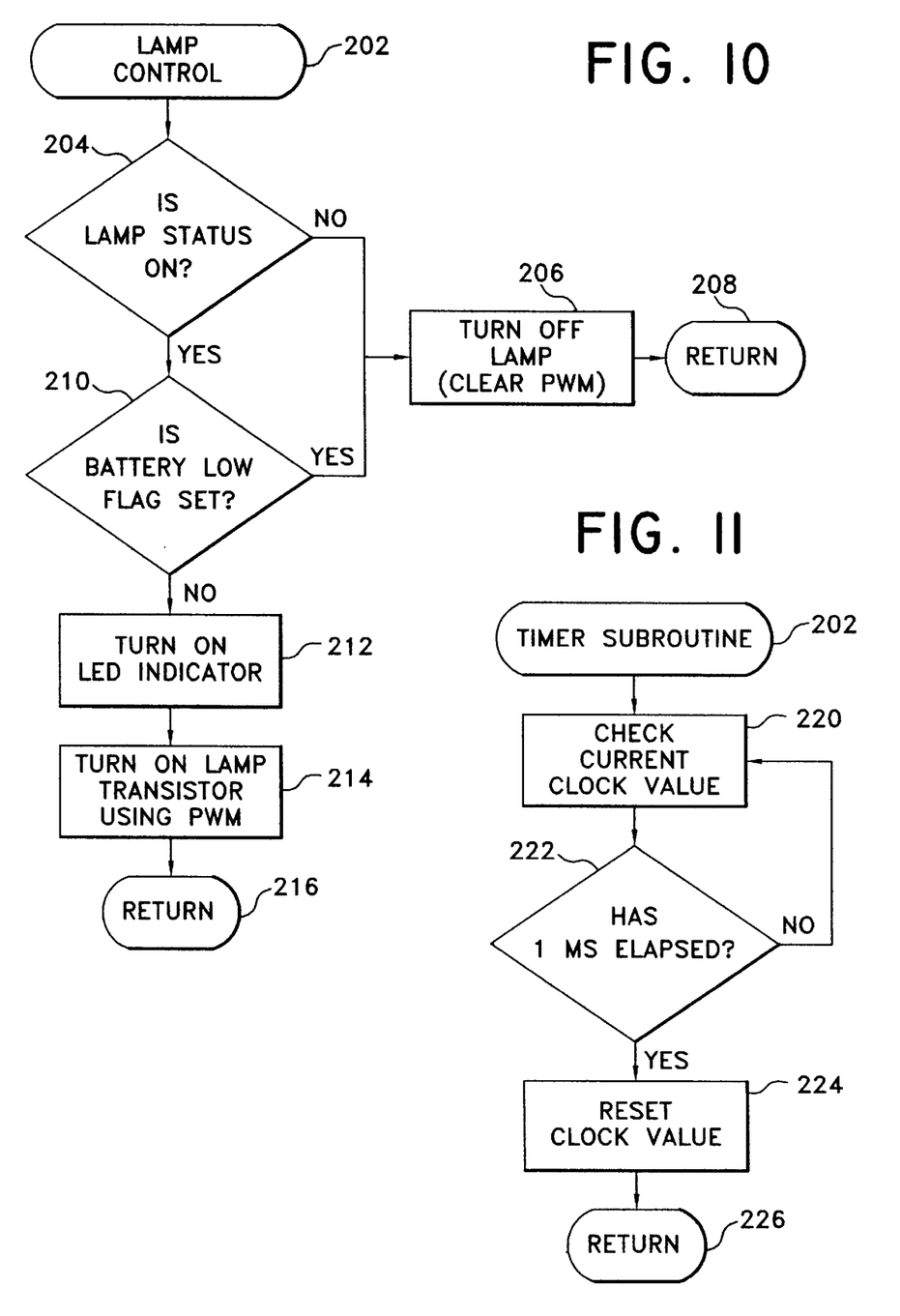
FIG. 10 is a flowchart of a Lamp Control Subroutine of a microcontroller program for a lighthead according to the present invention.
FIG. 11 is a flowchart of a Timer Subroutine of a microcontroller program for a lighthead according to the present invention.

FIG. 11 is a flowchart of a Timer subroutine of a micro-controller program for a lighthead according to the present invention. The Timer subroutine is the starting point of the Main Loop program flow. Under normal circumstances, the remaining subroutines 102–110 will execute in less than one millisecond. However, the exact amount of time may vary. Thus, the Timer subroutine is used to time or pace the flow of the program and maintain an approximately one millisecond execution time for the Main Loop 100. Each time the Timer subroutine is accessed, it checks the value of a free-running clock (not shown) to determine how long the rest of the Main Loop 100 took to execute (step 220). A delay is then introduced by looping until the proper amount of time has elapsed (step 222). After the proper period of delay, the clock value is reset to zero (step 224) and the program returns to the main loop (step 226). Other methods of introducing a delay to maintain a set program pace known to those skilled in the art may also be used.

Figure 6A:
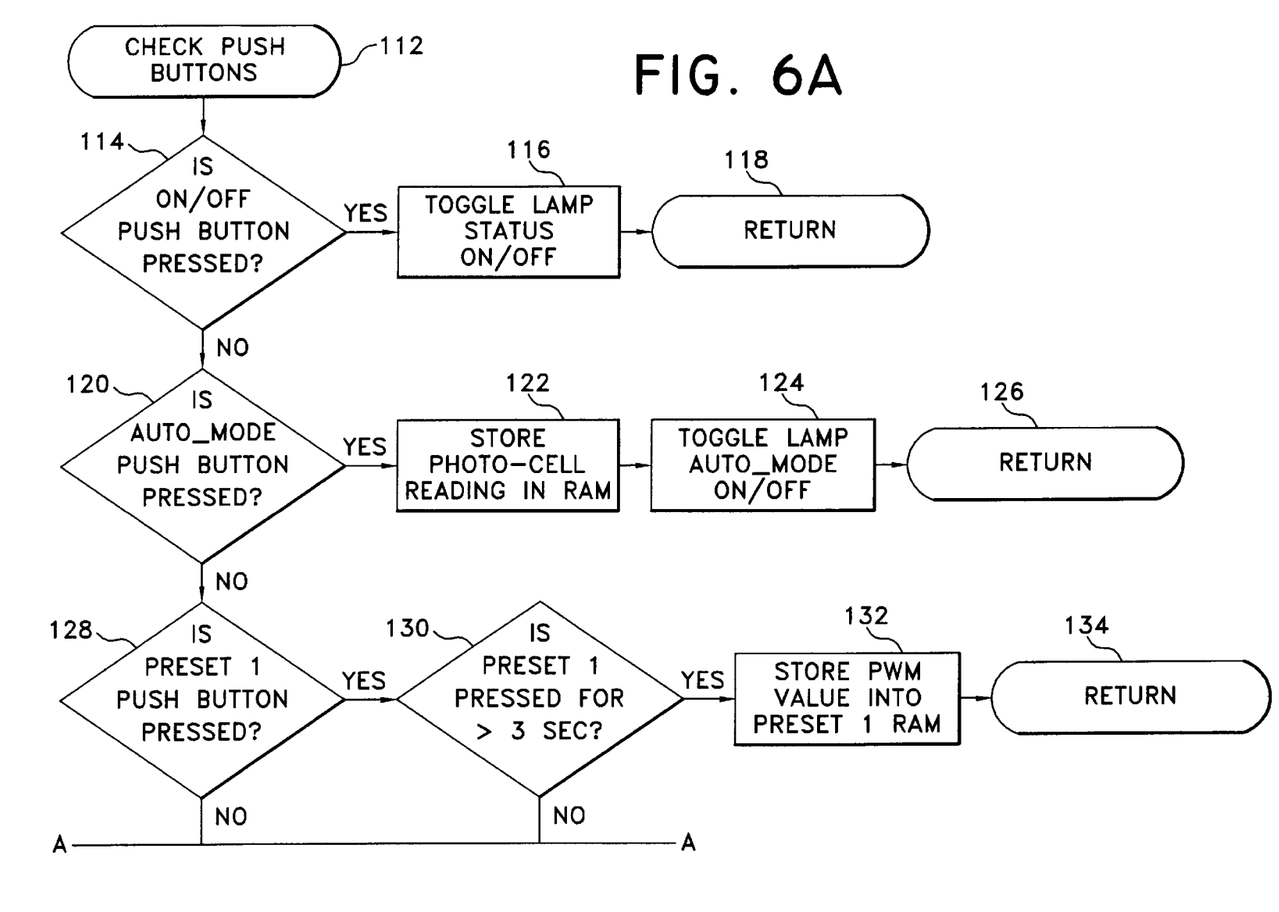
FIG. 6 is a flowchart of a Push Button Subroutine of a microcontroller program for a lighthead according to the present invention.
Figure 6B:
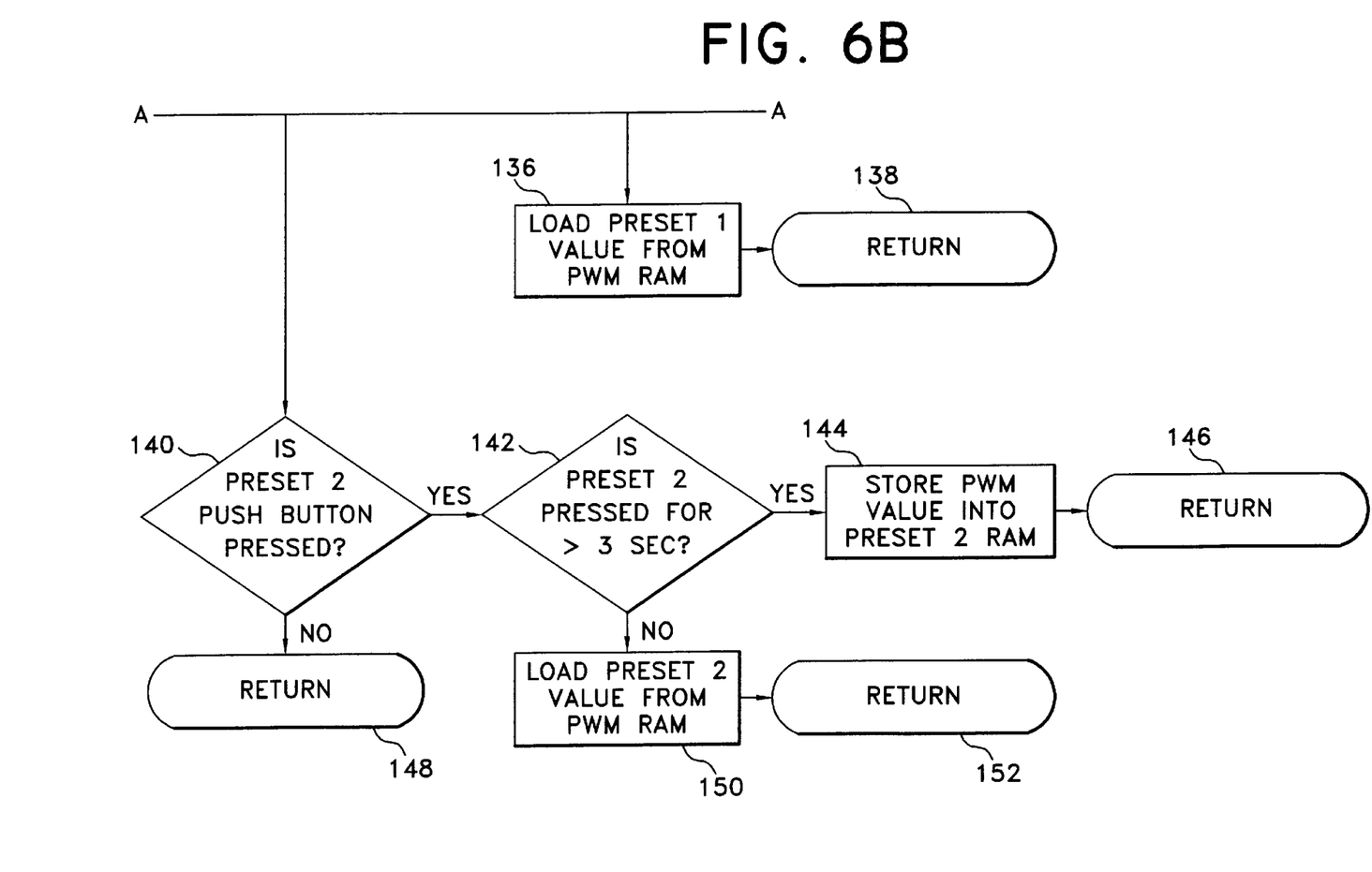

FIG. 6 is a flowchart of a Push Button Subroutine of a microcontroller program for a lighthead according to the present invention. The subroutine is entered from block 112 and each input switch is examined in turn. If the ON/OFF button 24 is pressed (step 114), the program toggles the LAMP STATUS flag from off to on or on to off (step 116) and then returns to the main loop (step 118). In the preferred embodiment, only one button should be pressed at a time. Thus, once a pressed button is detected and the appropriate action taken, there is no need to continue within the subroutine and check other buttons.

The program then polls the AUTO button 26 (step 120). If this button is pressed, the reflected light intensity as measured by the photo-sensor 20 is stored in a designated location in RAM (step 122). The AUTO MODE flag is then toggled between on and off (step 124) and the program returns to the main loop (step 126).

Next, the program polls the first preset switch 27 (step 128). If the switch has been pressed for more than three seconds (step 130), the duty cycle for the current pulse width modulated light intensity is stored in a designated RAM location (step 132) and the program returns to the main loop (step 134). If the switch has been released before three seconds have elapsed, a previously stored duty cycle is retrieved from memory and used to set the present duty cycle. (Step 136). The program then returns to the main loop (step 138). The second preset switch 28 is polled in a similar manner to set or retrieve a second preset intensity. (Steps 140–146; 150–152). The program then returns to the main loop at step 148. The switches on a remote unit 30 can be polled in a similar manner, as will be apparent to those skilled in the art.

Figure 7:
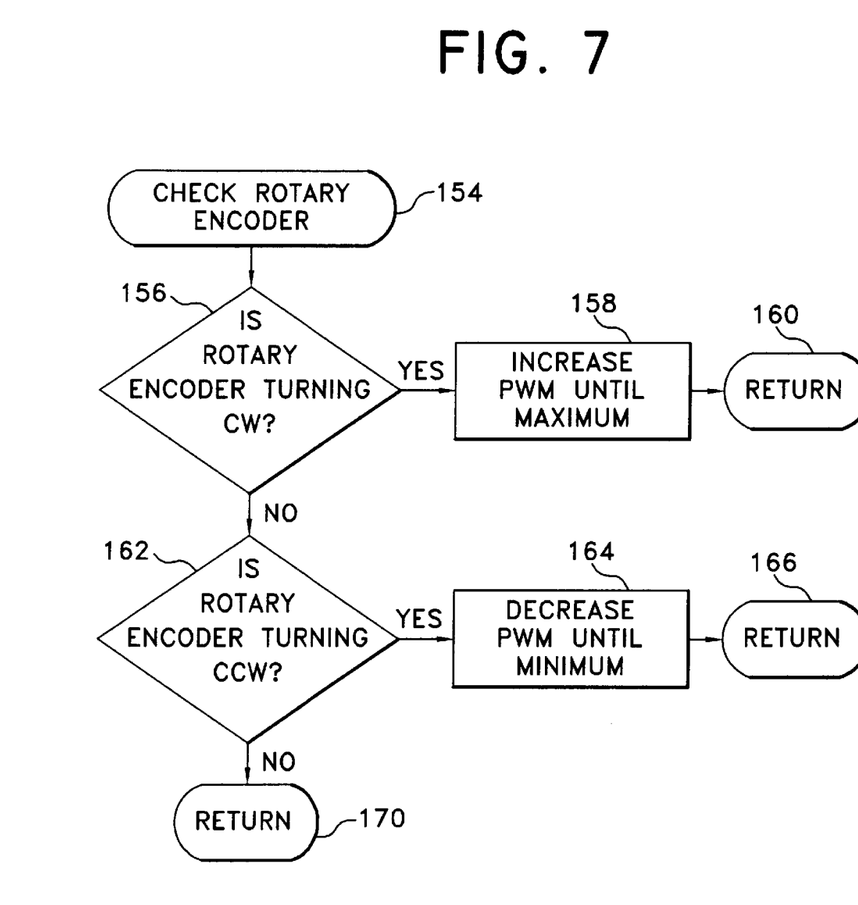
FIG. 7 is a flowchart of a Rotary Encoder Subroutine of a microcontroller program for a lighthead according to the present invention.

FIG. 7 is a flowchart of a Rotary Encoder Subroutine of a microcontroller program for a lighthead according to the present invention, which is entered at block 154. If the user is turning the rotary encoder 21 in a clockwise direction (step 156), the stored duty cycle value is increased unless a maximum value has been reached (step 158). The program then returns to the main loop (step 160). In the preferred embodiment, the duty cycle can be increased to 100%, i.e., the light is continuously on. If the user is turning the rotary encoder 21 in a counter-clockwise direction (step 162), the stored duty cycle value is decreased until a minimum value has been reached (step 162). In the preferred embodiment, the duty cycle can be decreased to a value of 10%. The subroutine then returns to the main loop (step 166). If the rotary encoder 21 is not being rotated, the subroutine returns to the main loop without adjusting the duty cycle. (Step 170). The rotary encoder 21 may operate in either a stepwise or continuous manner.

Figure 8:
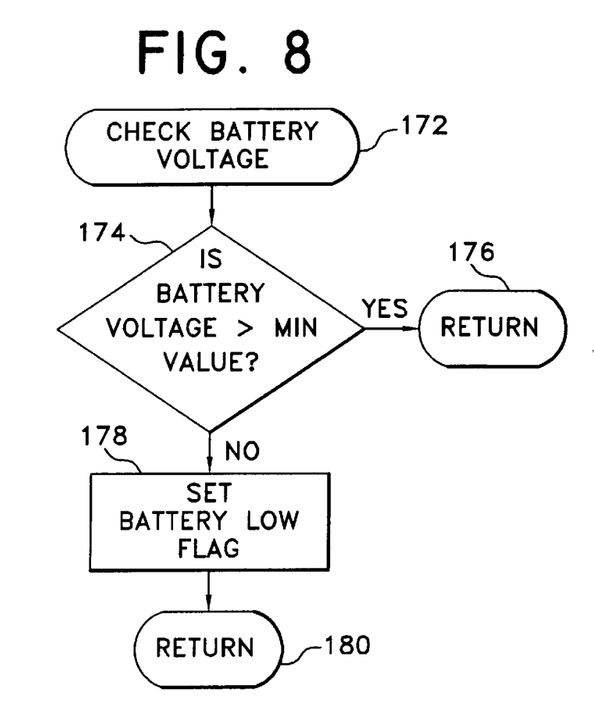
FIG. 8 is a flowchart of a Battery Check Subroutine of a microcontroller program for a lighthead according to the present invention.

FIG. 8 is a flowchart of a Battery Check Subroutine of a microcontroller program for a lighthead according to the present invention. Because an adequate light intensity from lamp 12 can only be maintained if the supply voltage is sufficient, the microcontroller monitors the power voltage at node 46 (discussed above) and compares it to a minimum battery voltage. Preferably, the minimum voltage for a 12–14 volt battery is 10 volts. If the battery voltage is greater than the minimum voltage (step 174), the subroutine simply returns to the main loop. (Step 176). Otherwise, the BATTERY LOW flag is set (step 178) and the subroutine returns. (Step 180).

Figure 9:
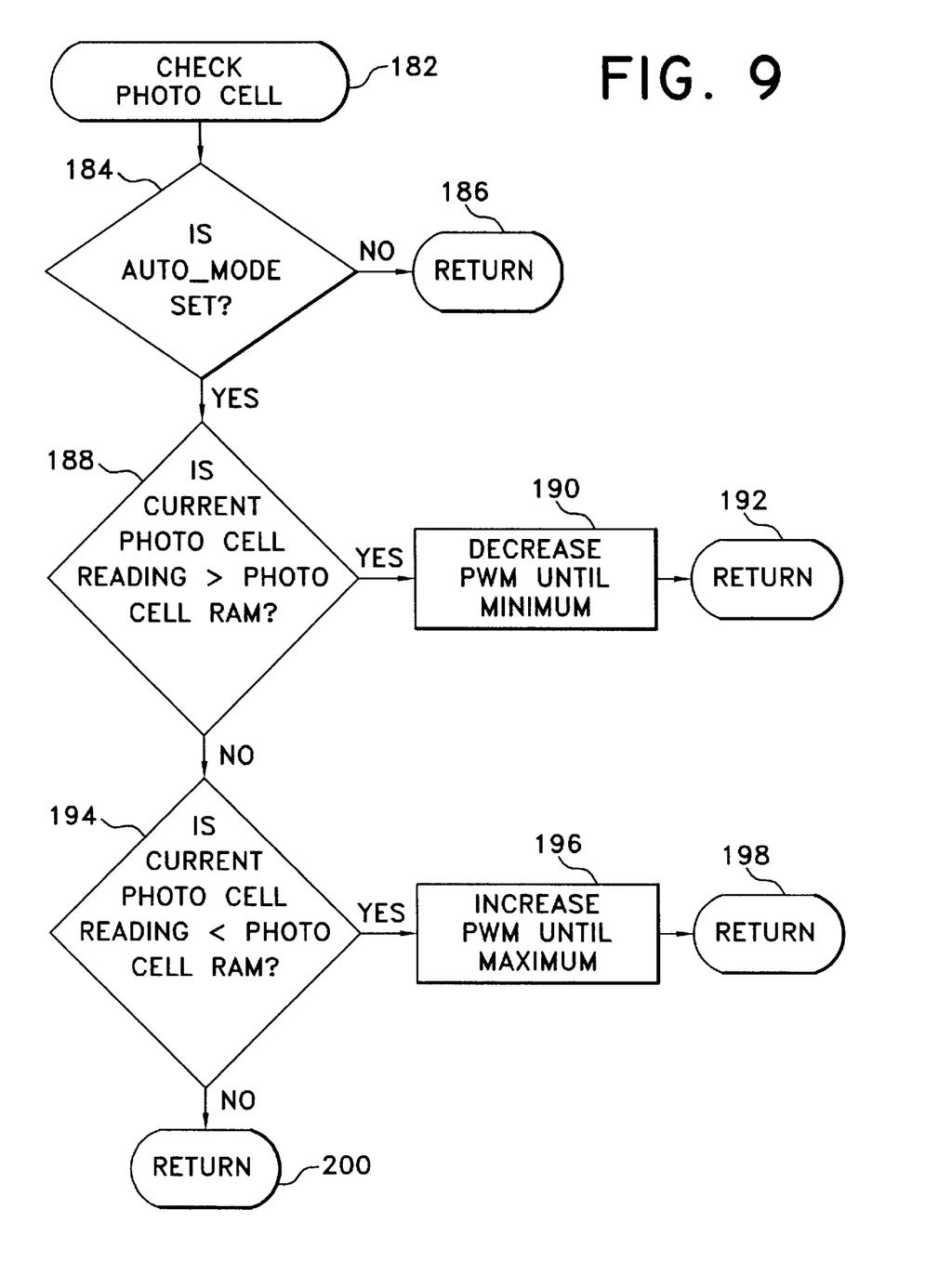
FIG. 9 is a flowchart of a Photo-Cell Subroutine of a microcontroller program for a lighthead according to the present invention.

FIG. 9 is a flowchart of a Photo-Cell Subroutine of a microcontroller program for a lighthead according to the present invention. When this subroutine is entered (step 182), the AUTO MODE flag is checked (step 184). If the AUTO MODE flag is not set, the routine returns to the main loop (step 186). If the AUTO MODE flag is set, indicating that the unit is in AUTO mode, the presently reflected light intensity, as measured by the photo-sensor 20, is compared with the previously stored reflected light intensity. If the present light intensity is too bright (step :188) (i.e., the present light intensity is greater than the previously stored reflected light intensity), the duty cycle is decreased, unless a minimum value has been reached (step 190), and the subroutine returns to the main loop (step 192). If the present light intensity is too dim (step 194) (i.e., the present light intensity is less than the previously stored reflected light intensity), the duty cycle is increased, unless a maximum value has been reached (step 196), and the subroutine returns to the main loop (step 198). If the present light intensity is equal to the stored intensity, the subroutine returns to the main loop without changing the duty cycle. (Step 200).

Preferably, the maximum duty cycle is 100% and the minimum duty cycle value is 50%. Although the minimum value may be less than 50%, this may result in a shift in the color of the light, leading to decreased quality video images. Accordingly, in an alternative embodiment, this value may be selected by the user.

It should be noted that AUTO mode will compensate not only for changes in reflected light intensity caused by changes in ambient lighting conditions, but also for changes resulting from a dimming of the light emitted by lamp 12 as the battery voltage drops. Thus, a stable light intensity is maintained for as long as possible.

FIG. 10 is a flowchart of a Lamp Control Subroutine of a microcontroller program for a lighthead according to the present invention. This subroutine initially checks the LAMP STATUS flag. (Step 204). If the LAMP STATUS flag is off (indicating that the user has pressed the power button to turn off the lamp), the lamp is turned off by setting the duty cycle to zero (step 206) and the subroutine returns to the main loop. (Step 208). Next, the BATTERY LOW flag is checked. (Step 210). If it has been set by the Battery Check subroutine, the battery cannot supply enough voltage to adequately power the light. Accordingly, the lamp 12 is turned off by setting the duty cycle to zero. Alternatively, the lamp 12 may be turned off by means of a separate switch connected in series to lamp 12 and toggled by an output of microcontroller 19 or a separate voltage comparison circuit (not shown).

If the lamp is on and the BATTERY LOW flag is not set, a power indicator LED 42 is activated (step 212) and the duty cycle is set accordingly (step 214). In the preferred embodiment, the pulse width modulation is controlled by free-running circuitry within the micro-controller 19 that operates independently of the program flow. In an alternative embodiment, the light modulation may be controlled directly with an appropriate software routine. However, this will increase program complexity.

While the foregoing description and drawings represent the preferred embodiments of the present invention, it will be understood that various changes and modifications may be made without departing from the spirit and scope of the present invention.

We claim:

1. A video lighthead comprising:
   a lighthead having a housing;
   a light source located in said housing;
   a pulse width modulation circuit for controlling said light source, wherein the brightness of said light is determined by the duty cycle of said pulse width modulation circuit;
   a photo-sensor for measuring the intensity of light reflected from an object in front of said light source;
   means for automatically adjusting said duty cycle in response to the measured intensity of reflected light;
   a memory device for storing a first reflected light intensity value;
   a comparator for comparing said first stored intensity value with a second reflected light intensity value, said comparator outputting a comparison value to said means for automatically adjusting in order to adjust said duty cycle so that said second reflected light intensity value is made substantially equal to said first stored intensity value;
   a means for deactivating said light when the suply voltage is less than a predefined minimum value;
   and a means for manually adjusting said duty cycle.

2. A video lighthead comprising:
   a lighthead having a housing;
   a light source located in said housing;
   a pulse width modulation circuit for controlling said light source, wherein the brightness of said light is determined by the duty cycle of said pulse width modulation circuit;
   a photo-sensor for measuring the intensity of light reflected from an object in front of said light source;
   means for automatically adjusting said duty cycle in response to the measured intensity of reflected light;
   means for manually adjusting said duty cycle;
   a memory device for storing the reflected light intensity value;
   a comparator for comparing said first stored intensity value with a second reflected light intensity value, said comparator outputting a comparison value to said means for automatically adjusting in order to adjust said duty cycle so that said second reflected light intensity value is made substantially equal to the first stored intensity value;
   and a means for deactivating said light when the supply voltage is less than a predefined minimum value.

3. The lighthead of claim 2, further comprising a switch which toggles said lamphead between an automatic adjustment mode and a manual adjustment mode.

4. The lighthead of claim 1, wherein said means for automatically adjusting said duty cycle adjusts said duty cycle in response to a change in the brightness of said light to thereby maintain a constant light brightness as a voltage supplied by a battery driving said light changes over time.

5. A video lighthead comprising:
   a lighthead having a housing;
   a light source located in said housing;
   a pulse width modulation circuit for controlling said light source, wherein the brightness of said light is determined by the duty cycle of said pulse width modulation circuit;
   a photo-sensor for measuring the intensity of light reflected from an object in front of said light source;
   means for automatically adjusting said duty cycle in response to the measured intensity of reflected light;
   means for comparing the magnitude of a supply voltage driving said light with a predefined minimum value;
   means for deactivating said light when said supply voltage is less than said predefined minimum value;
   a memory device for storing a first reflected light intensity value;
   a comparator for comparing said first stored intensity value with a second reflected light intensity value, said comparator outputting a comparison value to the means for automatically adjusting in order to adjust said duty cycle so that said second reflected light intensity value is made substantially equal to the first stored intensity value;
   and a means for manually adjusting said duty cycle.

6. A method for automatically adjusting the intensity of light emitted by a lighthead comprising the steps of:
   (a) providing a pulse-width modulated light source with a controllable duty cycle;
   (b) retrieving a preset duty cycles;
   (c) setting the controllable duty cycle to said retrieved preset duty cycle;
   (d) measuring a first reflected light intensity from an object in front of said light source;
   (e) measuring a second reflected light intensity from said object in front of said light source;
   (f) comparing said measured second reflected light intensity with said measured first reflected intensity to produce a comparison signal;
   (g) adjusting said duty cycle in response to said comparison signal;
   (h) repeating steps (f) and (g) until said measured second reflected light intensity substantially equals said measured first reflected intensity; and
   the method further comprising the steps of:
   measuring the voltage applied to said light source;
   comparing said measured voltage to a predefined minimum value; and
   deactivating said light source if said measured voltage is less than or equal to said predefined minimum value.

7. A method for automatically adjusting the intensity of light emitted by a lighthead comprising the steps of:
   (a) providing a pulse-width modulated light source with a controllable duty cycle;
   (b) measuring a first reflected light intensity from an object in front of said light source;
   (c) measuring a second reflected light intensity from said object in front of said light source;
   (d) comparing said measured second reflected light intensity with said measured first reflected light intensity to produce a comparison signal;
   (e) adjusting said duty cycle in response to said comparison signal; and
   (f) repeating steps (d) and (e) until said measured second reflected light intensity substantially equals said measured first reflected light intensity;
   the method further comprising the steps of:
   measuring the voltage applied to said light source;
   comparing said measured voltage to a predefined minimum value; and
   deactivating said light source if said measured voltage is less than or equal to said predefined minimum value.

* * * * *